Figure 1:
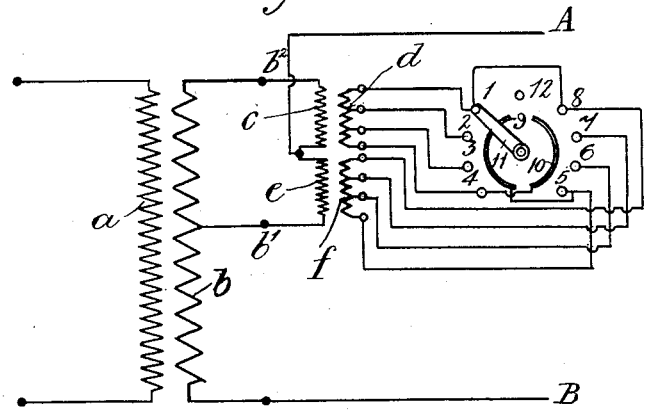

F. E. BERRY.
ELECTRICAL TRANSFORMER FOR REGULATING OR VARYING THE VOLTAGE OF THE CURRENT SUPPLIED THEREFROM.
APPLICATION FILED OCT. 31, 1918.

1,396,551.

Patented Nov. 8, 1921.

Inventor.
F. E. Berry,
By A. S. Pattison
Atty.

UNITED STATES PATENT OFFICE.

FREDERICK EDMUND BERRY, OF HAYES, ENGLAND.

ELECTRICAL TRANSFORMER FOR REGULATING OR VARYING THE VOLTAGE OF THE CURRENT SUPPLIED THEREFROM.

1,396,551.

Specification of Letters Patent.  Patented Nov. 8, 1921.

Application filed October 31, 1918. Serial No. 260,531.

*To all whom it may concern:*

Be it known that I, FREDERICK EDMUND BERRY, a subject of the King of Great Britain and Ireland, residing at Hayes, in the county of Middlesex, England, have invented Improvements in or Relating to Electrical Transformers for Regulating or Varying the Voltage of the Current Supplied Therefrom, of which the following is a specification.

For regulating the voltage of the current supplied from the secondary side of an electrical transformer, it has heretofore been common to provide the primary or secondary winding of the transformer with a number of tappings and to associate therewith a switch whereby the length of the active portion of the primary or secondary winding in circuit can be altered and the voltage of the secondary circuit correspondingly varied. Such an arrangement however necessitates the use of a regulating switch or switches connected in the circuit which is required to be regulated.

In an alternative arrangement, in which rotary apparatus is employed, the windings thereof are in the circuit the voltage of which is to be regulated. Such an arrangement presents obvious disadvantages when used on high tension circuits.

Now the present invention has for its object to provide means for enabling the voltage of the secondary circuit to be varied by varying the transformer ratio of the primary and secondary windings of the transfomer without using a regulating device or devices connected in the circuit of either the primary or secondary winding of the transformer.

To this end, there is associated with one of the windings of a main transformer arrangement, or with each of the windings thereof voltage regulating means external to and mechanically independent of such winding or windings.

For this purpose there may be used a supplementary transformer arrangement the primary of which is connected to different points of one of the windings of the main transformer, and the secondary of which is adapted, as by tappings, and circuit interconnecting means, conveniently, by switch mechanism, to admit of the action of such supplementary transformer arrangement on the winding of the main transformer with which such supplementary transformer is associated, being varied to suit requirement.

Or, instead of using a supplementary transformer arrangement, an inductive arrangement, comprising for example one or more induction regulators, can be associated with one of the windings of the main transformer.

In each case the arrangement is such that by suitable manipulation of the supplementary transformer arrangement, the transformer ratio of the primary and secondary windings of the main transformer can be varied without opening the circuit of either of these windings and the voltage of the secondary circuit regulated to suit varying requirements.

The invention can be applied in connection with single phase or poly-phase transformers.

The supplementary transformer arrangement may conveniently comprise two small transformers. In this case the connection of one of the main supply leads to one of the windings of the main transformer may be effected through the primary winding of windings of the supplementary transformer arrangement.

Voltage regulating mechanism according to the invention can be constructed and arranged in various ways as will now be more particularly described with reference to Figs. 1, 2 and 3 of the drawing accompanying my provisional specification and which show, by way of example and diagrammatically, three such arrangements each embodying a supplementary transformer arrangement comprising two small transformers.

In each arrangement, and for the sake of simplicity, the voltage regulating mechanism is shown associated with the secondary winding of a single phase transformer.

In each arrangement shown, $a$ represents the primary winding and $b$ the secondary winding of the main transformer, the second winding having a terminal or tapping at $b^1$ shown as adjacent to a terminal $b^2$ at the end of such winding.

In each arrangement also the supplementary transformer arrangement for obtaining the desired regulation in the voltage of the current supplied from the secondary winding comprises two small transformers, $c$ and $d$ being respectively the primary and secondary windings of one of these transformers $e$ and $f$ the corresponding windings of the other transformer. The primary windings $c$ and $e$ of these two small transformers are connected in series with each other and to the terminals $b^1$ and $b^2$ of the secondary winding $b$ of the main transformer in one or other of the ways shown. The second or secondary set of windings $d$ and $f$ of the two small transformers, one or other or both of which may have tappings, as shown, are interconnected with each other either with or without regulating switches.

In each case, A and B are the leads to the secondary supply circuit from the secondary winding $b$ of the transformer to which the regulating arrangement is fitted.

In Fig. 1, the supply lead A is connected to a point between the primary windings $c$ and $e$ of the small transformers. The second set of windings $d$ and $f$ of the two supplementary transformers are shown arranged with tappings connected to regulating switch mechanism. Two separate regulating switches may be used, or a combined switch for the two windings may conveniently be employed, as in the arrangement illustrated. The combined switch shown comprises two parts of which contacts 1 to 4 and a collecting segment 9 form one part, while contacts 5 to 8 and collecting segment 10 form the second part. 11 is a brush designed to bridge the collecting segment 9 and any one of the segments 1 to 4, or to bridge the collecting segment 10 and any one of the contacts 5 to 8.

With brush 11 bearing simultaneously on contact 1 and collecting segment 9, the whole of the secondary winding $f$ of the transformer $e, f$ is short circuited so that the voltage on the primary winding $e$ of such transformer will be a minimum and the arrangement will be equivalent, neglecting losses and voltage drop in the transformer windings, to connecting the supply main A to the tapping $b^1$ of the winding $b$ of the main transformer.

With brush 11 bearing simultaneously on contact 8 and the collecting segment 10, the secondary winding $d$ of the transformer $c, d$ is short circuited so that the voltage on the primary winding $c$ of such transformer is a minimum and the arrangement is equivalent, neglecting losses and voltage drop in the transformer windings, to connecting the supply main A to the terminal $b^2$ of the winding $b$ of the transformer.

With brush 11 bearing on one or other of the contacts 1 to 8, and collecting segment 9 or 10, the arrangement is equivalent to connecting the supply main A to a point in the secondary winding of the main transformer between terminals $b^2$ and $b^1$ that is determined by the position of the tappings on the secondary windings $d$ and $f$ of the small transformers in use.

12 is a stop to prevent the brush 9 moving beyond contact 1 in a clockwise direction, or beyond contact 8, in an anti-clockwise direction.

Figure 2:
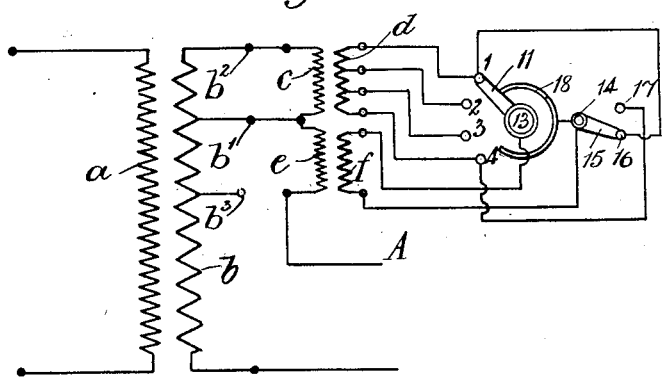

In Fig. 2, the secondary winding $d$ of the transformer $c\ d$ is shown with tappings connected to a regulating switch. This regulating switch, which is shown diagrammatically, is of well known construction and is commonly called a combined regulating and reversing switch. The secondary winding $f$ of the transformer $e\ f$ is without tappings, but has one terminal connected to a collecting ring 13 of the regulating switch and the second terminal connected to the common point 14 of a change-over switch having a change-over arm 15, which is adapted to connect the point 14 to a contact 16 connected to contact 1 of the regulating switch, or to a contact 17 connected to contact 4 of the regulating switch. Point 14 is also connected to a segmental shaped contact 18 which is arranged so that brush 11, before leaving contact 1, or contact 4, depending in which direction it is being operated, will make connection with it and thus bridge collecting ring 13 and contact 18. The limiting position of the brush in one direction of movement is with the change-over switch 15 in the position bridging point 14 and contact 17, and brush 11 bridging contact 1 and collecting ring 13. The limiting position in the opposite direction of movement is when the brush 11 bridges contact 4 and collecting ring 13 after having been moved through a complete revolution from contact 4. The brush 11 can be operated in an anti-clockwise direction only from the first mentioned limiting position, and by known means, forming part of the said combined regulating and reversing switch, is made to move the change-over switch 15 into a position to bridge contacts 14 and 16 when it bears on contact 18 during its travel from contact 4 to contact 1 in an anti-clockwise direction. The said regulating switch is so designed in a manner well known, that it is not possible to move the brush from the second limiting position in an anti-clockwise direction with the change-over switch 15 bridging contacts 14 and 16. The brush can of course be moved in a clockwise direction from its second limiting position and when being operated in this direction it will cause the change-over switch arm 15 to move into a position to bridge contacts 14 and 17 when it is bearing on contact 18 during its travel from contact 1 to contact 4 in a clockwise direction.

The limiting position with arm 15 bridging contacts 14 and 17 and brush 11 bridging contact 1 and collecting ring 13 is equivalent to connecting the supply lead A to some point $b^3$ in the secondary winding $b$ of the main transformer depending on the design of the supplementary transformers $c$, 13

$d$ and $ef$ and the positions of the tapping $b^1$. The other limiting position with arm 15 bridging contacts 14 and 16, and brush 11 bridging contact 4 and collecting ring 5, is equivalent to connecting the supply lead A to point $b^2$ of the winding $b$ of the main transformer. At intermediate positions of the brush the arrangement is equivalent to connecting the supply lead A to some point in the primary winding $b$ of the main transformer between the points $b^2$ and $b^3$ of such winding that is determined by the position of the tapping on the transformer $c, d$ in use and the position of the change-over switch 15.

In the examples shown, the transformers $c, d$ and $e, f$ are assumed to be similar in construction as regards their windings, but they may be differently constructed without altering the essential features of the invention.

Figure 3:
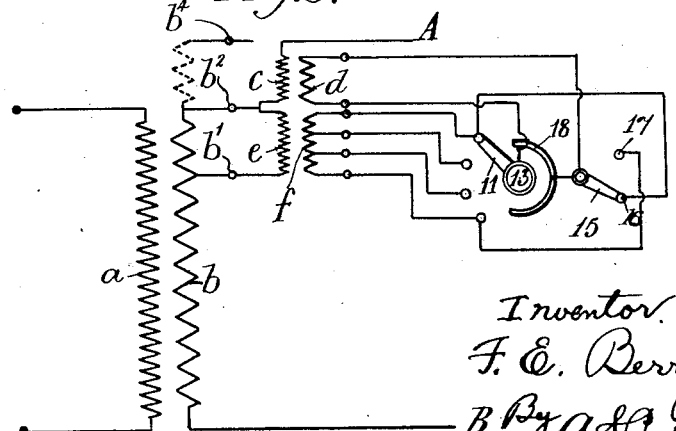

In Fig. 3, the supplementary primary winding $e$ is connected to the points $b^1 b^2$ of the main secondary winding $b$ and to one end of the secondary winding $c$ the other end of which is connected to the supply lead A. The arrangement is very similar to that shown in Fig. 2 except that the first limiting position is equivalent to connecting the supply lead A to some point $b^4$ which would be in the winding $b$ of the main transformer if such winding were considered to be extended beyond the point $b^2$, that is to say, it would be equivalent to increasing the voltage of the secondary circuit of the main transformer, and the second limiting position is equivalent to connecting the supply lead A to tapping $b^1$ of the winding $b$ of the main transformer. This arrangement calls for a special design of the winding $b$ of the main transformer windings, as regards that portion thereof between the points $b^1$ and $b^2$, on account of the current distributed in the winding.

Means of any known or suitable kind can be associated with the brush 11 and collecting segments 9 and 10, or ring 13, to prevent the interruption of the circuit or short circuiting, of part of the secondary winding or windings of the small transformers when the switch is operated to vary the transformer ratio of the windings of the main transformer. To prevent complications of the drawings such additional means are omitted from the figures shown but may be of the kind commonly used for the same purpose in electric switches.

As will be seen by the use of arrangements such as described, the actual regulating of the voltage is done by alteration in connections between circuits entirely separate from the supply circuit to be regulated so that the windings and switch gear connected thereto can be designed for any convenient voltage. The connections between the voltage regulating arrangement and the main transformer to be regulated are two in number only, for a single phase supply, and proportionately few in the case of polyphase supply, so that the regulating arrangement can be placed at a distance from the main transformer, or wherever most convenient, without excessive cost or alteration in connection.

What I claim is:—

1. In an alternating current electrical distribution system, a main transformer winding, a remote supplementary transformer arrangement comprising two primary windings connected in series, leads connecting a portion of the main transformer winding to the said primary windings, secondary windings inductively associated with the latter windings and switching means for separately varying the inductive relation of each secondary winding to its corresponding primary winding.

2. In an alternating current electrical distribution system, a main transformer winding, a remote supplementary transformer arrangement comprising two primary windings connected in series, leads connecting a portion of the main transformer winding to the said primary windings, secondary windings inductively associated with the latter windings, tappings provided upon one of the secondary windings and switching means acting through the tappings for separately varying the inductive relation of each secondary winding to its corresponding primary winding.

3. In an alternating current electrical distribution system, a main transformer winding, a remote supplementary transformer arrangement comprising two primary windings connected in series, leads connecting a portion of the said main transformer winding to both primary windings, a supply conductor connected to the main transformer winding through the said primary windings, secondary windings inductively associated with the latter windings and switching means for separately varying the inductive relation of each secondary winding to its corresponding primary winding.

4. In an alternating current electrical distribution system, a main transformer winding, a remote supplementary transformer arrangement comprising two primary windings connected in series, leads connecting a portion of the said main transformer winding to opposite ends of one of the primary windings and to one end of the second primary winding, a supply conductor connected to the opposite end of the secondary primary winding, secondary windings inductively associated with the said primary windings and switching means for separately varying the inductive relation of each secondary winding to its corresponding primary winding.

5. In an alternating current electrical distribution system, a main transformer winding, a remote supplementary transformer arrangement comprising two primary windings connected in series and two secondary windings, leads connecting a portion of the main transformer winding to opposite ends of one of the primary windings and to one end of the second primary winding, a supply conductor connected to the opposite end of the second primary winding, tappings provided upon the secondary winding associated with the primary winding connected to a portion of the main transformer winding, leads extending from the ends of the second secondary winding and switching means acting through the tappings and leads for separately varying the inductive relation of each secondary winding to its corresponding primary winding.

6. In an alternating current electrical distribution system, a main transformer winding, a remote supplementary transformer arrangement comprising two primary windings connected in series, and two secondary windings, a lead connecting one end of the main transformer winding to a point between the two primary windings, a lead connecting an intermediate point in the length of the main transformer winding to the opposite end of one of the said primary windings, a supply conductor connected to the second end of the other primary winding, and switching means whereby the secondary windings can be separately connected up in various ways relative to their corresponding primary windings and thus bring one or other, or parts thereof, into effective action so that the electrical action of the said secondary windings on the primary windings can be varied at will and the voltage of the secondary current supplied by the main transformer regulated to suit requirement.

Signed at London, England, this fifteenth day of October, 1918.

FREDERICK EDMUND BERRY.